Sept. 23, 1952  E. A. RUDOLPH  2,611,327
DISPENSING APPARATUS
Filed Oct. 28, 1949  2 SHEETS—SHEET 1
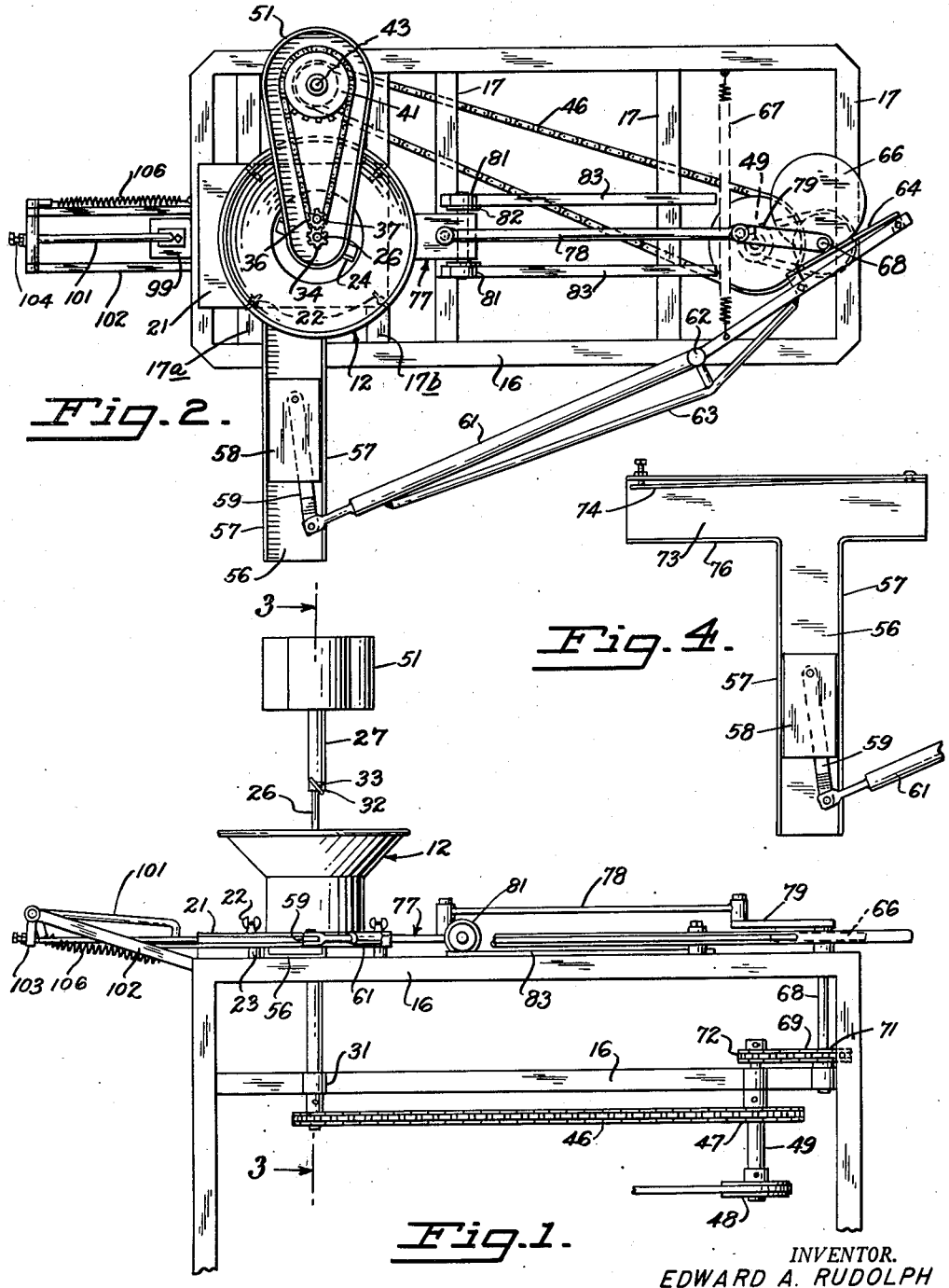
INVENTOR.
EDWARD A. RUDOLPH
BY
Townsend and Townsend
ATTORNEYS

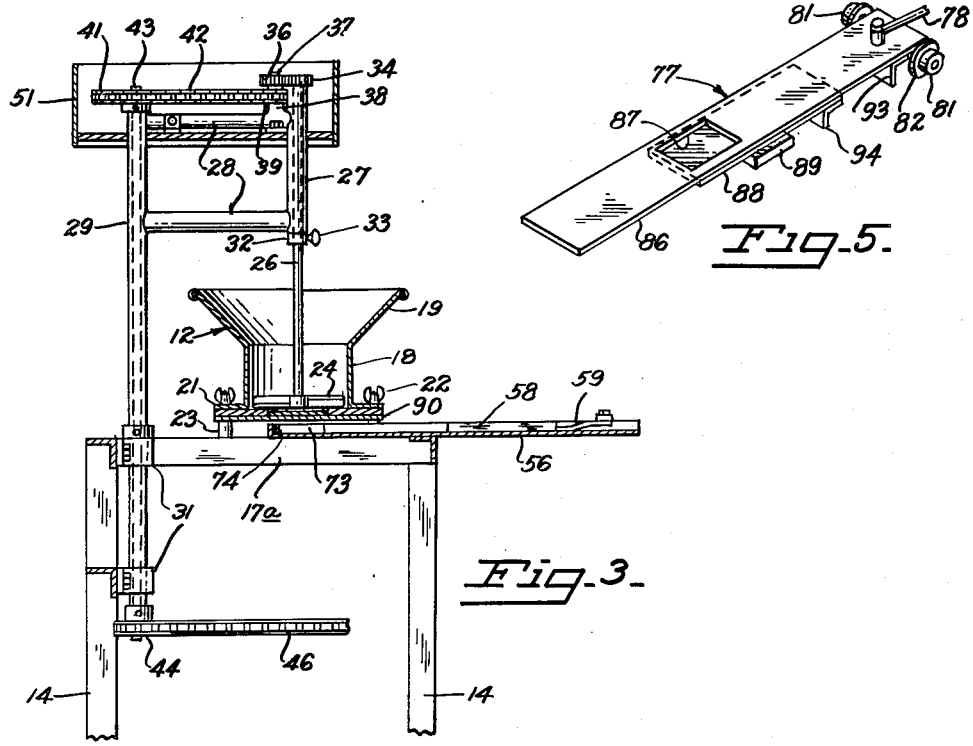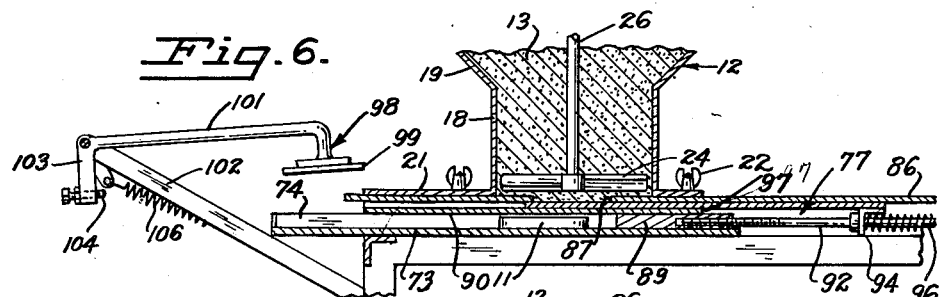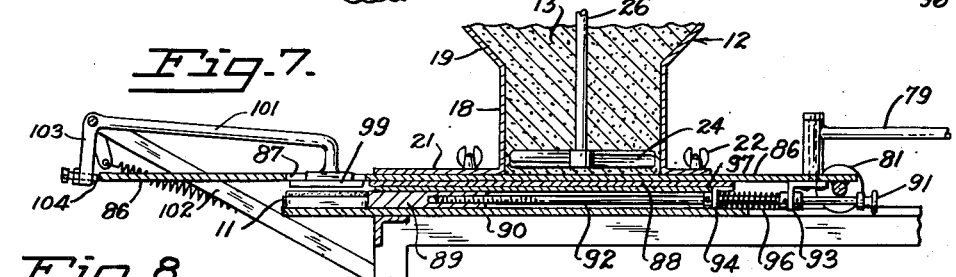

Patented Sept. 23, 1952

2,611,327

UNITED STATES PATENT OFFICE 2,611,327

DISPENSING APPARATUS

Edward Albert Rudolph, Richmond Annex, Calif.

Application October 28, 1949, Serial No. 124,098

16 Claims. (Cl. 107—1)

This invention relates to new and useful improvements in dispensing apparatus and has particular reference to machines for applying sandwich filler to pieces of bread in the course of preparation of sandwiches on a mass-production basis.

This invention solves certain problems which have long existed and which have deterred the manufacture of sandwiches by automatic machinery. One of these problems is the application to each sandwich of a uniform, metered quantity of filler. Another important problem is the even spreading of the filler over the entire surface of the bread. Heretofore these problems have not been satisfactorily solved in automatic sandwich machinery and accordingly, at the present time, sandwiches are almost entirely manufactured by hand. Even manual preparation does not insure uniformity in quantity applied to each sandwich nor evenness of spreading since these matters are largely governed by the skill of the operator.

Accordingly, the present machine has for one of its principal objects the depositing and spreading of a metered quantity of filler upon a piece of bread, distributed evenly over the entire surface.

Further objects of the present invention will become apparent upon reading the following specification and referring to the accompanying drawings in which similar characters of reference represent corresponding parts in each of the several views.

In the drawings:

Fig. 1 is a side elevation of a machine embodying the present invention.

Fig. 2 is a plan.

Fig. 3 is a section taken substantially along the line 3—3 of Fig. 1.

Fig. 4 is a view in plan of the guideways directing the movement of the bread through the machine.

Fig. 5 is a perspective of a reciprocating slide employed in the machine.

Fig. 6 is a longitudinal vertical section of a portion of the machine showing the slide in a retracted position.

Fig. 7 is a view similar to Fig. 6 showing the slide in a protracted position.

Fig. 8 is a bottom plan of a portion of the machine.

The present invention contemplates the use of an automatic machine which receives a slice of bread 11 and automatically moves the bread along a predetermined path, provision being made for expelling from a hopper 12 a predetermined desired quantity of sandwich filler 13, and a deposit of the filler on the bread.

The machine employs a table-like frame having vertical legs 14 and a horizontal top made up of parallel longitudinal members 16 and a plurality of parallel transverse members 17, all suitably joined together to afford a rigid foundation for the mechanism hereinafter described.

Positioned adjacent one end of the table is a hopper 12 having a cylindrical bottom 18 and a frusto-conical top portion 19; the lower part of the bottom portion 18 is provided with a wide, horizontal, annular flange 21 which is secured by means of a plurality of wing nuts 22 to transverse members 17a and 17b. The plane of the bottom surface of the flange 21 is spaced above the top of the transverse members 17a and 17b a fixed distance, said distance being determined in part by spacer members 23 and by parts of the reciprocating slide hereinafter described. Adjacent the bottom of the cylindrical bottom portion 18 of the hopper is a continuously revolving impeller 24, the blades of which have sufficient pitch so as continuously to bias the sandwich filler 13 or other ingredients contained in the hopper downwardly and, further, to blend and stir the ingredients to a uniform, smooth consistency. The impeller 24 is fixed to and revolves on a vertical shaft 26, the upper end of which is journalled within a sleeve 27 rigidly attached by means of horizontal frame members 28 to a vertical housing 29, which housing, in turn, is fixed by means of brackets 31 to the table so that the housing 29, sleeve 27 and shaft 26 are all held in vertical alignment.

A collar 32 is connected for rotation with the shaft 26 by means of thumb screw 33, the collar being normally positioned for abutment against the lower end of the sleeve 27. The upper end of the shaft 26 bears a pinion 34 which meshes with mitered pinion 36 on stub shaft 37 which is suitably housed in a boss 38 protruding above upper horizontal frame member 28. The stub shaft 37 also carries a sprocket wheel 39 which is connected to a sprocket wheel 41 by horizontally disposed chain 42. The sprocket wheel 41 is affixed to the upper end of vertical shaft 43 which passes through and is journalled within the housing 29. The lower end of the shaft 43 carries a sprocket 44 which is connected by chain 46 to a sprocket 47, said sprocket 47 being driven by electric motor (not shown) connected by a belt to pulley 48 mounted on the same stub shaft 49 as sprocket 47. Thus, the motor drives the impeller 24 by means of the various chains and sprockets hereinbefore described. In order to prevent lubricant or other foreign material entering the sandwich ingredients, a casing 51 is disposed about the pinions 34 and 36 and chain 42.

When it is desired to clean the machine, the thumb screw 33 is loosened, permitting the pinion 34, shaft 26, and impeller 24 to be moved upwardly until the impeller clears the upper edge of the hopper 12. The wing nuts 22 may then be removed and the hopper 12 withdrawn from the machine.

Projecting laterally at one side of the machine from a position below the hopper is a horizontal guideway 56, having upstanding edges 57 the distance between which is substantially equal to that of a slice of bread 11. Slices of bread are inserted manually one by one onto the guideway 56 and are moved into the machine by reciprocation of the block 58 which slides over the guideway 56. It will be apparent that an automatic feed might be substituted for manual insertion. Reciprocation of the block 58 is accomplished by means of the electric motor hereinbefore mentioned through the instrumentality of the mechanism next described. A link 59 is pivotally connected adjacent the front edge of the block 58, said link being horizontally disposed and extending generally rearwardly of the block. The rearward end of the link is pivotally connected to one end of an elongated horizontally disposed rocker arm 61. The rocker arm is pivoted intermediate its length at pivot 62 mounted on the longitudinal frame member 16. A stiffening member 63 is welded to the rocker arm 61 to impart rigidity. The end of the rocker arm opposite link 59 bears a cam following surface 64 which engages the eccentric cam 66, a spring 67 connecting the rocker arm 61 and a suitable portion of the frame of the machine insuring constant engagement of the cam following surface 64 with the cam 66. The cam 66 is caused to rotate by reason of its connection to vertical shaft 68, the lower end of which bears a sprocket 69 which is connected by chain 71 to sprocket 72 mounted on stub shaft 49 which is in turn driven by the electric motor (not shown). As the eccentric cam 66 revolves, it causes the arm 61 to rock about its pivot 62 and thus, as will be seen, particularly with reference to Fig. 2, block 58 is caused to reciprocate within the guideway 56. The operator, accordingly, places a slice of bread in the guideway 56 when the block 58 is in retracted position and inward movement of the block 58 feeds the bread into the machine.

Referring now to Fig. 4, it will be seen that the inward end of the guideway terminates in a second guideway 73 normal thereto so that the guideways 56 and 73, each of which is horizontally disposed, in plan assume the shape of a T. An adjustable spring-biased edge member 74 disposed along by the side of the guideway 73 opposite the entrance to guideway 56 is provided so as to accommodate slices of bread of varying widths. The bread is caused to reciprocate along guideway 73 between the upstanding edges 76 thereof by a slide 77 shown in perspective in Fig. 5 and in bottom plan in Fig. 8, the reciprocation of said slide 77 being timed with respect to reciprocation of block 58 so that the slide 77 is fully retracted when the block 58 is at the inner end of its stroke, and thus, the bread is fed into the machine in advance of projection of the slide.

Reciprocation of the slide 77 is accomplished by reason of the pivoted connection therewith of the horizontally disposed link 78 which is attached at its opposite end to crank 79, which is in turn attached to vertical shaft 68. The angularity of crank 79 with respect to eccentric cam 66 accomplishes the requisite timed relationship between reciprocation of the block 58 and the slide 77. The inner end of the slide 77 is provided with a pair of rollers 81 mounted for rotation about a horizontal axis perpendicular to the direction of the travel of the slide, each of said rollers having a flange 82 along its inner edge. The rollers 81 slide along horizontally disposed trackways 83, the flanges 82 engaging the inner vertical edges of said trackways and thus insuring positive alignment of the slide 77 as it reciprocates. The slide 77 consists essentially of two elements disposed one above the other. The upper element 86 is positively connected to the link 79 and thus at all times reciprocates with uniformly accelerated motion as crank 79 revolves. The surface of the upper member is provided with a rectangular aperture 87 dimensioned exactly to fit a slice of bread 11 and the thickness of the upper member 86 is exactly equal to the desired thickness of sandwich filler to be applied. Thus, the cubic displacement of the aperture 87 is exactly equal to the volume of filler to be dispensed for each slice of bread. When the slide 77 is in a retracted position the lower slide member 88 closes off the bottom of the aperture 87 and thus, as shown in Fig. 6, when the aperture 87 is below the hopper 12, it is filled with a predetermined quantity of filler 13 by reason of rotation of the impeller 24. As the slide 77 moves outwardly, the edge of the hopper flange 21 scrapes off the excess filler and the aperture 87 is filled with a fixed quantity of ingredients. The lower slide member 88 moves with the upper slide member 86 through most of the stroke of the latter and, as shown in Fig. 6, when the slide 77 is in retracted position, the lower member 88 is protracted relative to the upper member 86.

The lower member 88 carries a block 89 which engages the slices of bread 11 and moves them outwardly as the slide 77 protracts. The slide member 88 is separated from block 89 by stationary hold down plate 90 so that block 89 moves in guideway 73 underneath plate 90, said plate 90 holding the bread within the guideway. The relative position of the block 89 with respect to the lower member 88 may be adjusted by rotation of the knob 91 fixed to one end of horizontal rod 92, the opposite end of which is threaded into the block 89. The block 89 moves with the lower slide member 88. In retracted position it clears the opening in guideway 73 providing access from guideway 56, as shown in Fig. 4, and as slide 77 protracts the block 89 moves the slice of bread 11 along guideway 73.

The upper member 86 carries a bracket 93 and the lower member 88 carries a similar bracket 94, through both of which pass rod 92, said rod being free to slide within holes in brackets 93 and 94. A helical spring 96 surrounding rod 92 is disposed between the brackets 93 and 94, the action of the spring being such as to normally project the lower member 88 outward relative to the upper member 86, and thus, the lower member 88 closes off the aperture 87 in the upper member 86 when the aperture is under hopper 12. As the slide 77 projects nearly to the end of its stroke, the bracket 94 strikes the end 97 of plate 90 which prevents further outward movement of the lower member 88. As the upper member 86 continues its outward movement, the spring 96 is compressed between the brackets 93 and 94, the lower member 88 is held stationary, and the aperture 86 is opened. It will be understood that the block 89 is so located that, at the inner end of the stroke of slide 77, the slice of bread 11 is as shown in Fig. 6, and when the slide 77 is in full outward position, as in Fig. 7, the sandwich filler and aperture 87 is positioned directly above the slice of bread 11. Upon retraction of slide 77 spring 96 restores lower member 88 to the position relative to upper member 86 shown in Fig. 6.

The filler is forced out of the aperture 87 by means of a depressor 98, said depressor consisting of a pad 99 slightly smaller than the aperture 87, connected to one end of bell crank 101 which is pivotally mounted on a bracket 102 attached to the frame of the machine. Arm 103 of crank 101 carries an adjustable stop 104. When the upper member 86 of the slide 77 is at its extreme outward position, it contacts the stop 104 and thus causes the depressor 98 to move downward as shown in Fig. 7. A spring 106 normally holds the depressor 98 in elevated position and restores the depressor in such position when the slide 77 retracts. Downward movement of the member 98, as shown in Fig. 7, pushes sandwich filler out of the aperture 87 and presses it into firm engagement with the slice of bread 11 positioned immediately therebeneath. When the slide 77 retracts the depressor 98 is elevated, the bread 11 with a metered quantity of filler evenly spread thereupon may be removed for further processing.

It will be understood that, preferably, the underside of flange 21, the surfaces of upper slide member 86 and the upper surface of lower slide member 88 are all smooth and held in close, though slideable, engagement. Thus, filler does not lodge between the respective members and, further, the members move in their respective paths of travel without sticking.

Operation

In operation, a quantity of sandwich filler 13 is placed in the hopper 12, the hopper being replenished as required with further ingredients, the motor causes the impeller 24 to rotate and mix and blend the filler and feed it downwardly. The motor likewise causes rotation of the stub shaft 68 which turns the eccentric cam 66, and thus, causes the arm 61 to rock and thereby reciprocate the block 58. The operator inserts a slice of bread 11 within the guideway 56 upon each retraction of the block 58 or this operation may be performed by an automatic feeder. Each slice of bread is then automatically fed into the machine, its course of travel being inwardly along guideway 56 and then outwardly along the guideway 73 perpendicular thereto. The outward movement of the bread in guideway 73 is occasioned by reciprocation of the block 89 attached to the underside of lower member 88 of slide 77. The slide 77 is caused to reciprocate by reason of its connection to link 78, which is in turn pivotally connected to the crank 79 mounted for rotation with stub shaft 68. The slide 77, when in retracted position, is so constructed that the aperture 87 in the upper member 86 is immediately below the hopper 12 and the lower member 88 closes off the bottom of the aperture. Thus, the action of the impeller 24 is to completely fill the aperture 87 with sandwich filler. As the slide 77 moves outwardly, the edge of the flange 21 of the hopper scrapes over the top of the slide member 86 so that the aperture 87 is then completely filled with a quantity of filler exactly equal to the desired quantity to be deposited on the bread and having dimensions identical with the slice of bread 11. The aperture 87 and bread 11 move outwardly in guideway 73 until the lower slide member 88 contacts an abutment 97 which determines further movement of the lower member 88 while the upper member 86 continues the projection, thus, opening the aperture 87 and permitting the sandwich filler to be deposited on the bread. To insure discharge of the filler, depressor 98 moves into the aperture 87 and pushes the filler into contact with the bread. Upon retraction of the slide 77, the depressor 98 rises, the spring 96 restores the lower member 88 into proper position beneath the aperture 87, and the block 88 moves backwardly so as to clear the guideway 56, thus, permitting another slice of bread to be fed into the machine.

The machine, therefore, deposits on each slice of bread a uniform quantity of filler equal to the cubic displacement of aperture, and said filler is uniformly and evenly distributed over the surface of the slice.

I claim:

1. Apparatus of the character described comprising, a hopper for material to be dispensed, a guideway beneath said hopper, an apertured member arranged to move parallel to said guideway dimensioned to receive a charge of said material, a closure engaging said apertured member and closing off an end of said aperture during a portion of the cycle of the operation thereof and arranged to move a recipient along said guideway, and means for actuating said closure to open said aperture and permit discharge of said charge.

2. Apparatus of the character described, comprising, a hopper for material to be dispensed, a guideway beneath said hopper, an apertured member arranged to move parallel to said guideway dimensioned to receive a charge of said material, a closure engaging said apertured member and closing off an end of said aperture during a portion of the cycle of the operation thereof and arranged to move a recipient along said guideway, means for actuating said closure to open said aperture and permit discharge of said charge, and a depressor arranged to move said charge out of said aperture and onto said recipient.

3. Apparatus of the character described comprising, a hopper for material to be dispensed, a guideway beneath said hopper, an apertured member arranged to move parallel to said guideway dimensioned to receive a charge of said material, a closure engaging the apertured member and closing off an end of said aperture during a portion of the cycle of the operation thereof and arranged to move a recipient along said guideway, means for actuating said closure to open said aperture and permit discharge of said charge, and an impeller in said hopper biasing the contents thereof to fill said aperture with a charge when said aperture is beneath said hopper.

4. Apparatus of the character described comprising, a hopper for material to be dispensed, a guideway beneath said hopper, feeding means for positioning a recipient on said guideway, an apertured member arranged to move parallel to said guideway dimensioned to receive a charge of said material, a closure engaging the apertured member and closing off an end of said aperture during a portion of the cycle of the operation thereof and arranged to move a recipient along said guideway, means for actuating said closure to open said aperture and permit discharge of said charge, a depressor arranged to move said charge out of said aperture and onto said recipient, and an impeller in said hopper biasing the contents thereof to fill said aperture with a charge when said aperture is beneath said hopper.

5. Apparatus of the character described comprising, a hopper for material to be dispensed, a guideway beneath said hopper, feeding means for positioning a recipient on said guideway, an apertured member arranged to move parallel to said guideway dimensioned to receive a charge of said material, a closure engaging the apertured member and closing off an end of said aperture during a portion of the cycle of the operation thereof and arranged to move a recipient along said guideway, means for actuating said closure to open said aperture and permit discharge of said charge, a depressor arranged to move said charge out of said aperture and onto said recipient, and an impeller in said hopper biasing the contents thereof to fill said aperture with a charge when said aperture is beneath said hopper, said apertured member, said closure, said first-mentioned means and said feeding means being actuated in timed relationship.

6. A sandwich filling machine comprising, a hopper for filling material, a guideway for slices of bread extending beneath said hopper, an apertured member movable in a path above and parallel to said guideway, said aperture in cross-section having the dimension of a slice of bread and having a depth equal to the desired thickness of filling material, and a closure member engaging the under surface of said apertured member and arranged serially to close off the bottom of said aperture when said apertured member is beneath said hopper and to be retracted from beneath said aperture to permit discharge of said filling material onto said bread at a point removed from beneath said hopper.

7. A sandwich filling machine comprising, a hopper for filling material, a first guideway for slices of bread extending beneath said hopper, an apertured member movable in a path above and parallel to said first guideway, said aperture in cross-section having the dimension of a slice of bread and having a depth equal to the desired thickness of filling material, a closure member engaging the under surface of said apertured member and arranged serially to close off the bottom of said aperture when said apertured member is beneath said hopper and to be retracted from beneath said aperture to permit discharge of said filling material onto said bread at a point removed from beneath said hopper, a second guideway opening into said first guideway, first means for moving a slice of bread along said second guideway and into said first guideway in timed relationship to movement of said apertured member, and second means for moving said slice of bread along said first guideway to position said slice beneath said aperture when said closure member is retracted from beneath said aperture.

8. A sandwich filling machine comprising, a hopper for filling material, a first guideway for slices of bread extending beneath said hopper, an apertured member movable in a path above and parallel to said first guideway, said aperture in cross-section having the dimension of a slice of bread and having a depth equal to the desired thickness of filling material, a closure member engaging the under surface of said apertured member and arranged serially to close off the bottom of said aperture when said apertured member is beneath said hopper and to be retracted from beneath said aperture to permit discharge of said filling material onto said bread at a point removed from beneath said hopper, a second guideway opening into said first guideway, first means for moving a slice of bread along said second guideway and into said first guideway in timed relationship to movement of said apertured member, second means for moving said slice of bread along said first guideway to position said slice beneath said aperture when said closure member is retracted from beneath said aperture, and a depressor actuated by contact with said aperture member arranged to free said filling material out of said aperture and into firm engagement with said bread.

9. A sandwich filling machine comprising, a hopper for filling material, a guideway for slices of bread extending beneath said hopper, an apertured member movable in a path above and parallel to said guideway, said aperture in cross-section having the dimension of a slice of bread and having a depth equal to the desired thickness of filling material, a closure member engaging the under surface of said apertured member and arranged serially to close off the bottom of said aperture when said apertured member is beneath said hopper and to be retracted from beneath said aperture to permit discharge of said filling material onto said bread at a point removed from beneath said hopper, and a revolving blade in said hopper acting to feed filling material from said hopper completely to fill the aperture when said aperture is below said hopper.

10. A sandwich filling machine comprising, a hopper for filling material, a guideway for slices of bread extending beneath said hopper, an apertured member movable in a path above and parallel to said guideway, said aperture in cross-section having the dimension of a slice of bread and having a depth equal to the desired thickness of filling material, a closure member engaging the under surface of said apertured member and arranged serially to close off the bottom of said aperture when said apertured member is beneath said hopper and to be retracted from beneath said aperture to permit discharge of said filling material onto said bread, means biasing said closure member to close said aperture and move said closure member with said apertured member, and an abutment determining movement of said closure member and opening the underside of said aperture.

11. A sandwich filling machine comprising, a hopper for filling material, a guideway for slices of bread extending beneath said hopper, an apertured member movable in a path above and parallel to said guideway, said aperture in cross-section having the dimension of a slice of bread and having a depth equal to the desired thickness of filling material, a closure member engaging the under surface of said apertured member and arranged serially to close off the bottom of said aperture when said apertured member is beneath said hopper and to be retracted from beneath said aperture to permit discharge of said filling material onto said bread, means biasing said closure member to close said aperture and move said closure member with said apertured member, and a block carried by said closure member arranged to move slices of bread along said guideway.

12. A sandwich filling machine comprising, a hopper for filling material, a guideway for slices of bread extending beneath said hopper, an apertured member movable in a path above and parallel to said guideway, said aperture in cross-section having the dimension of a slice of bread and having a depth equal to the desired thickness of filling material, a closure member engaging the under surface of said apertured member and arranged serially to close off the bottom of said aperture when said apertured member is beneath said hopper and to be retracted from beneath said aperture to permit discharge of said filling material onto said bread, means biasing said closure member to close said aperture and move said closure member with said apertured member, a block carried by said closure member arranged to move slices of bread along said guideway, and an abutment determining movement of said closure member and opening the underside of said aperture.

13. A sandwich filling machine comprising, a hopper for filling material, a guideway for slices of bread extending beneath said hopper, an apertured member movable in a path above and parallel to said guideway, said aperture in cross-section having the dimension of a slice of bread and having a depth equal to the desired thickness of filling material, and a closure member engaging the under surface of said apertured member, said closure member arranged in slidable juxtaposition with the underside of said apertured member, and means to move said closure member and said apertured member relative to one another synchronously first to close said aperture and then to open said aperture.

14. In apparatus for dispensing a metered charge of material, a hopper, a member having an aperture dimensioned to receive therein a charge of material from said hopper, a closure member arranged to close off the bottom of said aperture when said aperture is being filled with material, means for imparting reciprocating motion to said apertured member and said closure member and to move said members from beneath said hopper, and means for then moving said closure member relative to said apertured member to open said aperture for discharge of said material onto a recipient.

15. In apparatus for dispensing a metered charge of material, a hopper, a member having an aperture dimensioned to receive therein a charge of material from said hopper, a closure member arranged to close off the bottom of said aperture when said aperture is being filled with material, means for moving said apertured member and said closure member from beneath said hopper, means for then moving said closure member relative to said apertured member to open said aperture for discharge of said material onto a recipient, and means for moving said recipient for said material in timed relation to said first-mentioned means and arranged to position said recipient under said aperture when said material is about to be discharged.

16. In apparatus for dispensing a metered charge of material, a hopper, a first member having an aperture dimensioned to receive from said hopper a metered charge, means for reciprocating said first member away from said hopper, a closure member arranged to close off the bottom of said aperture when said aperture is being filled with material, and means for reciprocating said closure member relative to said hopper and said first member to open said aperture for discharge of said material onto a recipient.

EDWARD ALBERT RUDOLPH.

REFERENCES CITED

The following references are of record in the file of this patent:

UNITED STATES PATENTS

| Number | Name | Date |
|---|---|---|
| 259,542 | Holmes | June 13, 1882 |
| 1,327,806 | Bunde | Jan. 13, 1920 |
| 1,460,825 | Peters et al. | July 3, 1923 |
| 1,585,114 | Rondolin | May 18, 1926 |
| 1,667,692 | Salerno | Apr. 24, 1928 |
| 2,136,505 | Hirschson | Nov. 15, 1938 |
| 2,189,214 | MacFarlane et al. | Feb. 6, 1940 |